United States Patent
Hebling et al.

(10) Patent No.: US 11,584,200 B2
(45) Date of Patent: Feb. 21, 2023

(54) ARRANGEMENT FOR OPERATING ONE OR MORE WINDOWS INSTALLED IN A VEHICLE

(71) Applicant: Continental Automotive GmbH, Hannover (DE)

(72) Inventors: Annette Hebling, Geisling (DE); Alexander Heinrich, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 151 days.

(21) Appl. No.: 16/469,048

(22) PCT Filed: Nov. 27, 2017

(86) PCT No.: PCT/EP2017/080482
§ 371 (c)(1),
(2) Date: Jun. 12, 2019

(87) PCT Pub. No.: WO2018/108501
PCT Pub. Date: Jun. 21, 2018

(65) Prior Publication Data
US 2020/0070631 A1    Mar. 5, 2020

(30) Foreign Application Priority Data

Dec. 12, 2016    (DE) .................... 10 2016 224 750.6

(51) Int. Cl.
*B60J 3/04*    (2006.01)
*B60R 25/01*    (2013.01)
(Continued)

(52) U.S. Cl.
CPC ............... *B60J 3/04* (2013.01); *B60R 25/01* (2013.01); *B60R 25/23* (2013.01); *B60R 25/305* (2013.01);
(Continued)

(58) Field of Classification Search
CPC ... B60Q 1/0023; B60R 25/245; B60R 25/243; B60R 25/246; B60R 25/248;
(Continued)

(56) References Cited

U.S. PATENT DOCUMENTS 8,077,011 B2 * 12/2011 McBride ............... B60R 25/245
340/5.72
9,886,805 B1 * 2/2018 Bianchi, III ....... G07C 9/00309
(Continued)

FOREIGN PATENT DOCUMENTS

CN    202753731 U    2/2013
CN    103693012 A    4/2014
(Continued)

OTHER PUBLICATIONS

International Search Report and Written Opinion dated Mar. 1, 2018 from corresponding International Patent Application No. PCT/EP2017/080482.

*Primary Examiner* — Nathnael Aynalem

(57) ABSTRACT

An arrangement for operating one or more windows (S1-S4, SF, SH), which are installed in a vehicle (FZ) and in particular delimit a passenger compartment (FGZ) and whose optical properties can be changed by electrical actuation, comprises a position-determining device (ZGA) for determining the position (P1-P3) of an object (IDG1) which is located outside the vehicle (FZ). In addition, the arrangement has a control device (STG, AST) which is configured to actuate the one or more windows (S1-S4, SF, SH) as a function of the position, determined by the position-determining device, and in particular the distance.

16 Claims, 2 Drawing Sheets

(51) Int. Cl.
    *B60R 25/23*     (2013.01)
    *B60R 25/30*     (2013.01)
    *B60R 25/31*     (2013.01)
    *G02F 1/01*     (2006.01)
    *G06V 20/56*     (2022.01)
    *B60R 25/25*     (2013.01)

(52) U.S. Cl.
    CPC ............ *B60R 25/31* (2013.01); *G02F 1/0121* (2013.01); *G06V 20/56* (2022.01); *B60R 25/25* (2013.01)

(58) Field of Classification Search
    CPC ..... B60R 25/25; B60R 25/252; B60R 25/255; B60R 25/257; B60R 25/24; B60R 2325/205; B60R 2325/20; B60R 25/305; B60R 25/31; B60R 25/00; H04W 4/48; H04W 4/80; G07C 2009/00984; G07C 2009/00341; G07C 2209/64; B60J 3/04
    USPC ............ 348/148; 340/426.1, 426.16, 426.36
    See application file for complete search history.

(56) References Cited

U.S. PATENT DOCUMENTS

| | | | | |
|---|---|---|---|---|
| 2001/0005170 | A1* | 6/2001 | Heide | G06K 7/0008 340/5.61 |
| 2002/0008615 | A1* | 1/2002 | Heide | B60R 25/24 340/426.1 |
| 2007/0200668 | A1 | 8/2007 | Kurpinski et al. | |
| 2007/0200669 | A1* | 8/2007 | McBride | G07C 9/00309 340/5.72 |
| 2007/0200672 | A1* | 8/2007 | McBride | B60R 25/245 340/5.72 |
| 2008/0001708 | A1 | 1/2008 | Nakashima et al. | |
| 2009/0256704 | A1 | 10/2009 | Ieda et al. | |
| 2011/0218709 | A1 | 9/2011 | Hermann | |
| 2011/0316680 | A1 | 12/2011 | Heininger | |
| 2014/0077931 | A1* | 3/2014 | Cho | B60R 25/245 340/5.72 |
| 2014/0219508 | A1 | 8/2014 | Guenter | |
| 2015/0057896 | A1 | 2/2015 | Yamane et al. | |
| 2015/0251588 | A1 | 9/2015 | Salter et al. | |
| 2015/0283937 | A1 | 10/2015 | Salter et al. | |
| 2015/0284984 | A1 | 10/2015 | Kanter et al. | |
| 2018/0079284 | A1* | 3/2018 | Choi | B60K 35/00 |
| 2018/0114079 | A1* | 4/2018 | Myers | G06K 9/66 |

FOREIGN PATENT DOCUMENTS

| | | | |
|---|---|---|---|
| CN | 204172651 U | 2/2015 | |
| DE | 10 2007 023 261 A1 | 12/2007 | |
| DE | 10 2010 010 057 A1 | 9/2011 | |
| DE | 10 2011 111 600 A1 | 2/2013 | |
| DE | 10 2011 083 772 A1 | 4/2013 | |
| DE | 10 2012 222 175 A1 | 6/2014 | |
| DE | 10 2015 015 736 A1 | 6/2016 | |
| DE | 10 2016 108 652 A1 | 12/2016 | |
| DE | 10 2016 110 995 A1 | 12/2016 | |
| FR | 2933437 A1 * | 1/2010 | ......... G07C 9/00309 |
| KR | 20150109753 A | 10/2015 | |
| WO | 2008/000795 A1 | 1/2008 | |

\* cited by examiner

ARRANGEMENT FOR OPERATING ONE OR MORE WINDOWS INSTALLED IN A VEHICLE

The present invention relates to an arrangement for operating one or more windows which are installed in a vehicle and in particular delimit a passenger compartment. In addition, the invention relates to a vehicle having a correspondingly specified arrangement.

In order to prevent unauthorized access to a vehicle, in particular motor vehicle, modern access authorization systems or access devices in vehicles use electronic security systems in which, in order to authenticate the user, a data communication takes place between a first communication device of the vehicle and a second communication device in a mobile identification transmitter of the user, such as a key or key fob. In this case, the mobile identification transmitter in an active access device transmits control signals and an identification code to the vehicle, for example as a result of an appropriate key being pressed by the user of the mobile identification transmitter, after which the vehicle is unlocked or locked if the identification code is correct.

In the case of a so-called passive access device, firstly a first communication device of the vehicle firstly emits, at predetermined regular time intervals, radio signals as interrogation signals or localization signals with a specific field strength in order to check whether a mobile identification transmitter is located in an approach range around the vehicle. If a mobile identification transmitter is approaching the vehicle and can finally receive its interrogation signals because it has entered the approach range, it will respond to the reception of an interrogation signal in order to initiate an authentication process and in order to be able to determine the position of the mobile identification transmitter with respect to the vehicle. For the authentication, data telegrams are exchanged in which ultimately the mobile identification transmitter transmits its identification code to the vehicle. If the authentication code is checked successfully, it is then possible for a user who is located directly at the vehicle to initiate unlocking of the corresponding vehicle door or of all the vehicle doors by activating a door handle. Since this requires no active operation of a mechanical or electrical identification transmitter or of a key to be performed by a user, this type of access authorization is also referred to as a passive access authorization check, and the corresponding access devices are referred to as passive electronic access devices.

In particular, in the case of a passive access device as just described, it can be disadvantageous that a user or driver does not always know whether a vehicle which is assigned to him has detected him when he enters the approach range and whether the radio signal with the identification code has arrived correctly at the vehicle.

Therefore, the object of the present invention is to provide a possible way of indicating the presence of an object in the vicinity of a vehicle or an approach.

According to a first aspect of the invention, an arrangement is therefore provided for operating one or more windows which are installed in a vehicle, and in particular delimit a passenger compartment and whose optical properties can be changed by an electrical actuation. In particular, the windows are transparent windows which can change their translucency as an optical property as a result of electrical actuation. The one or more transparent windows are advantageously configured in such a way that they change their translucency as a result of the application of electrical voltage. It is also conceivable that the color can be changed as an optical property of a window by electrical actuation or the application of a voltage to the window. For this purpose of changing the optical property of a window, the latter has, for example, an optically active material which can be actuated electrically. The arrangement also has a position-determining device for determining the position of an object which is located outside the vehicle, and a control device which is configured to actuate the one or more windows as a function of the position which is determined by the determining device. In this way, the presence of an object, such as of a user or driver, in the vicinity of a vehicle or an approach can be indicated.

In particular, the control device can be configured to actuate the one or more windows as a function of the distance between the vehicle and the object, in order, in particular, to change one or more optical properties of the one or more windows as a function of the distance. In this way, in particular a movement of an object such as a driver, toward the vehicle (approach) or else a movement of an object away from the vehicle (moving away) can be indicated by the vehicle.

According to a further refinement of the control device, said control device is configured to actuate the one or more windows in such way that their translucency is increased with decreasing distance. Correspondingly it is also conceivable that the translucency is reduced with increasing distance. In this way, for example it is signaled to a driver (as the object) who is approaching the vehicle that his approach is detected by the vehicle. Furthermore, in the case of increasing translucency of the one or more windows when the distance is decreasing, the vehicle is immediately placed in a ready-to-drive state in which the windows should, of course, have translucency which is as good or high as possible, in order to permit safe driving.

According to a further refinement of the control device, the latter is configured to start the actuation of the one or more windows from or below a first predetermined distance of the object from the vehicle, in particular again in such a way that their translucency is increased with decreasing distance.

It is also conceivable that the control device is configured to carry out the actuation of the one or more windows in a range between a first predetermined distance and a second predetermined distance between the vehicle and the object, wherein the first predetermined distance is greater than the second predetermined distance. In particular, the actuation is carried out by the control device in such way that the translucency of the one or more windows is increased with decreasing distance.

It is, moreover, conceivable that the control device is configured in such a way that at a specific distance of the object from the vehicle actuation is carried out with respect to a high translucency or transparency in order to place the one or more windows in a ready-to-drive state. It is assumed here that the one or more windows of the vehicle are in an initial state, such as in a parked state and/or a locked state, in which they are in a state with low translucency (e.g. an opaque state) in which a view into the passenger compartment is prevented. If the one or more windows should react with a delay to the actuation by the control device (depending on an optically active material which can be actuated in the one or more windows), and do not already immediately establish the desired translucency when actuation occurs, the actuation of the one or more windows can already be implemented before the object arrives at the vehicle, in such a way that the one or more windows then finally have the desired translucency when the object arrives at the vehicle.

If, for example, a driver (as the object) of a vehicle is detected at a distance of ten meters from the vehicle, the control device can already actuate the one or more windows at this distance, particularly in order to place them in a ready-to-drive state with high translucency, for example with maximum translucency. If the driver moves further toward the vehicle and finally reaches the vehicle, the one or more windows (even in the case of a delayed reaction of the optically active material in the windows) can already be in the desired state of translucency, or in particular when the driver sits in the vehicle, in order to drive said vehicle away.

In this context, it is also conceivable that the control device does not start the actuation, or does not start it exclusively at a specific distance of the object from the vehicle, but rather estimates the time by which the object will arrive at the vehicle, on the basis of a detected movement (starting from a specific position and changing position or speed). Correspondingly, taking into account the necessary time interval for a change which is to be carried out in the translucency of the one or more windows, the control device can start the actuation of the one or more windows at such a time (early time) that the change which is to be carried out in the translucency of the one or more windows is concluded before the estimated time of arrival of the object at the vehicle is reached.

According to one refinement of the position-determining device, the latter comprises an optical sensor, such as a camera, for capturing the object which is located outside the vehicle.

In this context, the arrangement can have an image-processing device for identifying the object (facial recognition) and/or specific properties of the object (movement or gait of the object). In this context, the image-processing device can also be part of the control device. In particular, the image-processing device can be configured to detect the type of object, for example whether the object is a human being or person who is approaching the vehicle. Furthermore, the image-processing device can be configured to detect specific properties of the object, and in this context can also recognize a face of a human being or specific movements or else the gait of a human. The face or the gait of the human being can also serve here as a biometric identification code.

According to one refinement of the control device, the latter is configured to actuate the one or more windows (in order to change optical properties such as the translucency) only when the image-processing device has detected a specific object, such as a human being and/or specific properties of the object, such as a specific face or a specific gait of a human being. This prevents undesired actuation of the one or more windows occurring, i.e. undesirably in the case of objects which are not assigned to the vehicle. This can, on the one hand, save current in the vehicle and, in addition, the optically active material which can be actuated in the windows can be conserved.

According to one refinement of the position-determining device, the latter comprises a radio module for receiving object-side radio signals which indicate the position of the object outside the vehicle. In this context, the object-side radio signals can contain position data of the object, such as for example location data, in particular location data of a satellite-based locating system (such as GPS (global positioning system) data). It is also conceivable that the location data are measured field strength values (RSSI (received signal strength indicator) values) of interrogation signals which have been emitted by one or more vehicle-side antennas for determining the position of the object.

According to one refinement of the radio module, the latter can additionally emit interrogation signals for triggering the object-side radio signals. For example, low-frequency radio signals (e.g. of approximately 125 kHz) can be emitted as interrogation signals, the field strength of which signals is then determined at the location of the object in order to determine the position, while high-frequency object-side radio signals (e.g. of 433 MHz) are then transmitted back as object-side radio signals. In addition, it is conceivable, for determining the position of the object, to carry out a transit time measurement of the interrogation signals from the vehicle to the object and then of the object-side radio signals from the object to the vehicle.

It is also conceivable for the object-side radio signals to comprise an identification code. In this context, the control device is configured to actuate the one or more windows only when the identification code received by means of the radio signals corresponds to a predetermined code. This in turn prevents undesired actuation of the one or more windows occurring, i.e. undesirably in the case of objects which are not assigned to the vehicle. As a result, on the one hand, there can be a saving in current in the vehicle and, in addition, the optically active material which can be actuated in the windows can be relieved.

According to another aspect of the invention, an access device for a vehicle is provided. Said access device has an arrangement as illustrated above or a refinement thereof, as well as a locking device for controlling the locking and/or unlocking of one or more doors of a vehicle in reaction to the reception of a correct identification code. The identification code can be a code which is transmitted by means of an object-side radio signal or else a biometric identification code.

According to a further aspect of the invention, a vehicle is provided which has a passenger compartment with one or more windows delimiting the latter, the optical properties of which windows can be changed by electrical actuation. In addition, the vehicle has an arrangement, as illustrated above, or a refinement thereof for operating the one or more windows.

According to a further aspect of the invention, a method is provided for operating one or more windows which are installed in a vehicle, and in particular delimit a passenger compartment and whose optical properties can be changed by electrical actuation. In this context the method has the following steps. A position of an object which is located outside the vehicle is determined. In addition, the one or more windows are actuated as a function of the position which is determined by the determining device.

Advantageous refinements of the arrangements, insofar as they can be applied to the vehicle and to the method, are also to be regarded as advantageous refinements of the vehicle and of the method, and vice versa.

In the section that follows, exemplary embodiments of the present invention will now be explained in more detail with reference to the accompanying drawings. Of the said figures.

Figure 1:
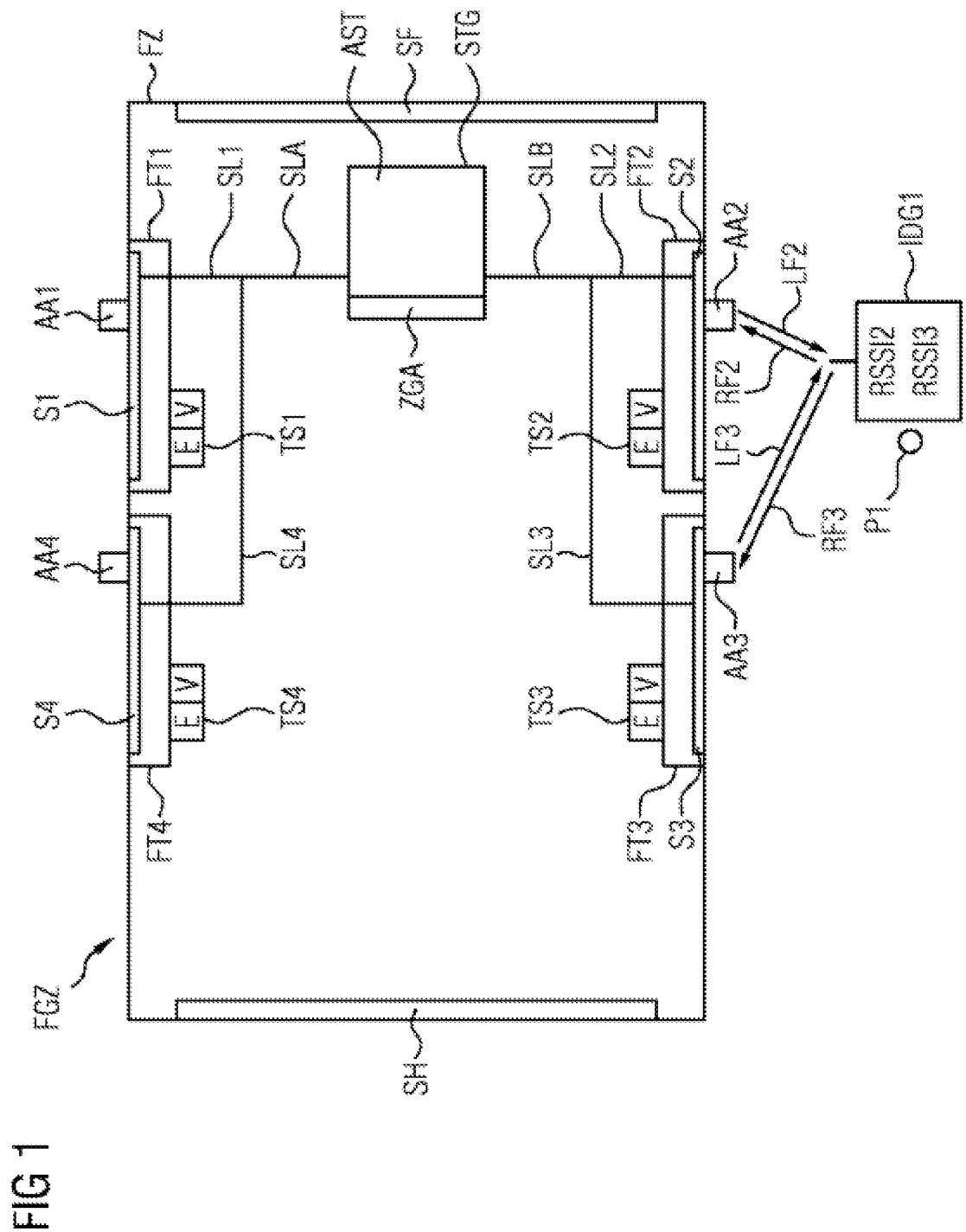
FIG. 1 shows a schematic illustration of a vehicle having an arrangement for operating one or more windows installed in the vehicle, according to an embodiment of the invention.

Reference will first be made to FIG. 1 in which a schematic illustration of a vehicle FZ with the essential components of an arrangement for operating one or more windows installed in the vehicle FZ according to an embodiment of the invention is shown. The vehicle FZ has here a passenger compartment FGZ which is delimited by a plurality of transparent windows S1, S2, S3, S4, SH and SF. At the rear end of the vehicle, the rear window SH is provided, while a front window SF is provided at the front end. The other windows S1, S2, S3 and S4 are respectively assigned to corresponding vehicle doors FT1, FT2, FT3 and FT4. Correspondingly, the specified vehicle doors FT1-FT4 also delimit the passenger compartment FGZ. The vehicle doors additionally comprise respective door locks TS1, TS2, TS3 and TS4 which are assigned to them and can be placed in an unlocked state E and a locked state V by electrical actuation.

The particular feature of the windows S1, S2, S3, S4, SH and SF is that they are transparent windows which have an optically active material which can be switched between states with different translucency behavior by electrical actuation. Such switchable windows or glazing are also referred to as intelligent glass, in which the translucency can be changed by applying an electrical voltage. The actuation is carried out here by means of a control device STG. To be more precise, the control device STG comprises an actuation device AST, which via control lines SLA, SL1, SL4 or SLB, SL2 and SL3 can electrically actuate the windows S1, S4 or S2 and S3 in order to change their translucency behavior. It is also conceivable here that, in addition to the central control device STG, further decentralized control units (not illustrated) are also present, which control units are assigned to the individual windows S1-S4 in order to actuate them electrically or to apply a voltage to them according to an instruction from the central control device STG (in order, as it were, to implement a "master-slave" principle between the control device and the control units).

In addition to the arrangement for operating the one or more windows S1 to S4, the vehicle FZ additionally has an access device whose central control component in the form of an access section ZGA is likewise accommodated in the control device STG. This access device is operated, in particular, in a so-called passive mode in which initially a first communication device (the antennas AA2, AA3) of the vehicle FZ emits interrogation signals LF2, LF3 (in particular in the form of low-frequency radio signals) with a specific field strength at regular time intervals in order to check whether a mobile identification transmitter IDG1 is located in an approach range or sensing range around the vehicle FZ. If a mobile identification transmitter approaches the vehicle and is finally able to receive the interrogation signals thereof, it will respond to the reception of an interrogation signal LF2 or LF3 in order to initiate an authentication process. In this context, data telegrams are exchanged in which ultimately the mobile identification transmitter IDG1 transmits its specific code or identification code to the vehicle in a high-frequency signal RF2 or RF3. If the authentication code is checked successfully (corresponding comparison with a stored code), it is then possible for a user who is located directly at the vehicle to initiate unlocking of the corresponding vehicle door or of all the vehicle doors by activating a door handle. Since this requires no active activation of a mechanical or electrical identification transmitter to be performed by a user, this type of access authorization is also referred to as a passive mode, and the corresponding access devices are referred to as passive electronic access devices.

In addition, with these passive access devices it is conceivable that not only the presence but also the position of the identification transmitter IDG1 with respect to the vehicle can be determined. As already mentioned, the interrogation signals LF2 and LF3 are emitted with a predetermined field strength by the antennas AA2 and AA3 (naturally also by the antennas AA1 and AA4, wherein for reasons of simple illustration details are given only on the antennas AA2 and AA3). Correspondingly, at the location P1 of the identification transmitter IDG1 the reception field strength of these interrogation signals is measured and a corresponding reception field strength value (RSSI=received signal strength indicator value) RSSI2 is determined for the signal LF2 and RSSI3 is determined for the signal LF3. These reception field strength values then permit conclusions to be drawn about the distance or the spacing of the identification transmitter IDG1 from the respective antennas AA2 and AA3. According to FIG. 1, owing to the greater proximity of the identification transmitter IDG1 to the antenna AA2, the corresponding reception field strength value RSSI2 will be greater than the reception field strength value RSSI3. The position of the identification transmitter IDG1 can thus also be determined by means of the corresponding correlation between the two reception field strength values.

Figure 2:
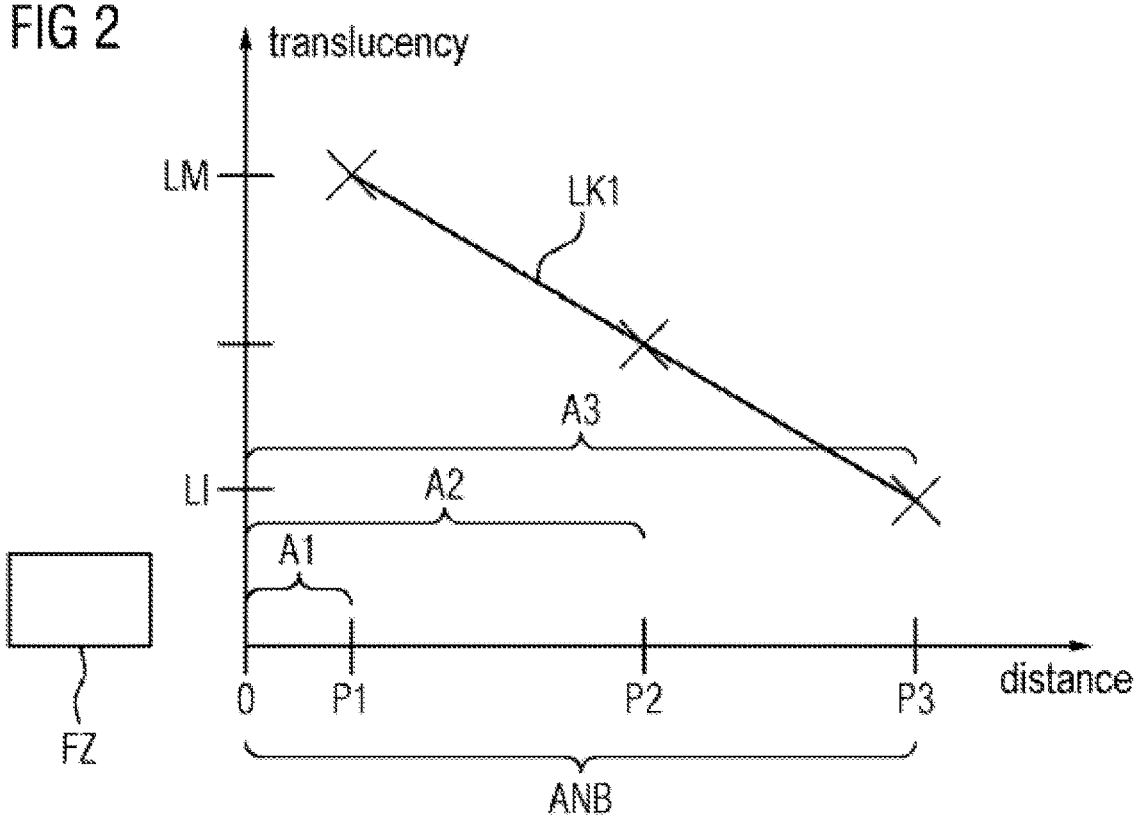
FIG. 2 shows a diagram illustrating the actuation of the one or more windows as a function of the position or the distance between the vehicle and an identification transmitter according to a first embodiment of the actuation.

Reference will now be made to FIG. 2, in which a schematic illustration relating to the setting of the translucency as a function of the distance of the identification transmitter IDG1 from the vehicle FZ according to a first embodiment is shown. As already explained above, the access section ZGA is configured to determine the position and, in particular, also the distance of the identification transmitter IDG1 (as an object located outside the vehicle) from the vehicle FZ. This information about the determined position or the distance can then be used by the actuation device AST to set the optical properties and, in particular, the translucency of the windows S1-S4, SF and SH (of all the windows or of specific windows thereof) as a function of the distance of the identification transmitter IDG1 from the vehicle FZ.

In the diagram in FIG. 2 it is assumed that the vehicle FZ is located at the position O. Furthermore, three exemplary positions are illustrated for an identification transmitter IDG1, specifically the position P1 which is the the closest possible one to the vehicle, at a distance A1 from the vehicle FZ, the position P2 at a distance A2, and finally the position P3 at a distance A3. In this context, the position P3 is intended to represent the distance up to which the interrogation signals of the vehicle-side antennas reach or up to which a position determination or distance determination is possible. The position P3 therefore marks the boundary of an approach region ANB within which the identification transmitter receives the interrogation signals and within which the distance determination is possible.

The situation taken as a starting point is that in which the vehicle FZ has been shut down or parked and the windows S1-S4, SF and SH have been placed by the actuation device AST in a state in which they have low translucency, in particular minimum translucency LI, in order to prevent any view into the passenger compartment FGZ for reasons of protection against theft. If a user with the identification transmitter IDG1 approaches the vehicle FZ and arrives at the position P3, a first exchange of radio signals between the vehicle FZ and the identification transmitter IDG1 begins, as detailed above, during which exchange an identification code is also transmitted from the identification transmitter IDG1 to the vehicle FZ. If the identification code which confirms the association of the identification transmitter IDG1 with the vehicle is correct, which is checked by the access section ZGA, the actuation device AST will start the actuation of one or more of the windows S1-S4, SF and SH in accordance with the curve LK1. This means that if a position determination or distance determination reveals that the identification transmitter IDG1 is continuing to approach the vehicle FZ, e.g. via the position P2 to the position P1 (as illustrated in FIG. 1), the actuation device will actuate the windows S1-S4, SF and SH correspondingly, in order to increase the translucency as the distance decreases, until the maximum translucency LM for a driving mode of the vehicle FZ is set at the position P1.

Figure 3:
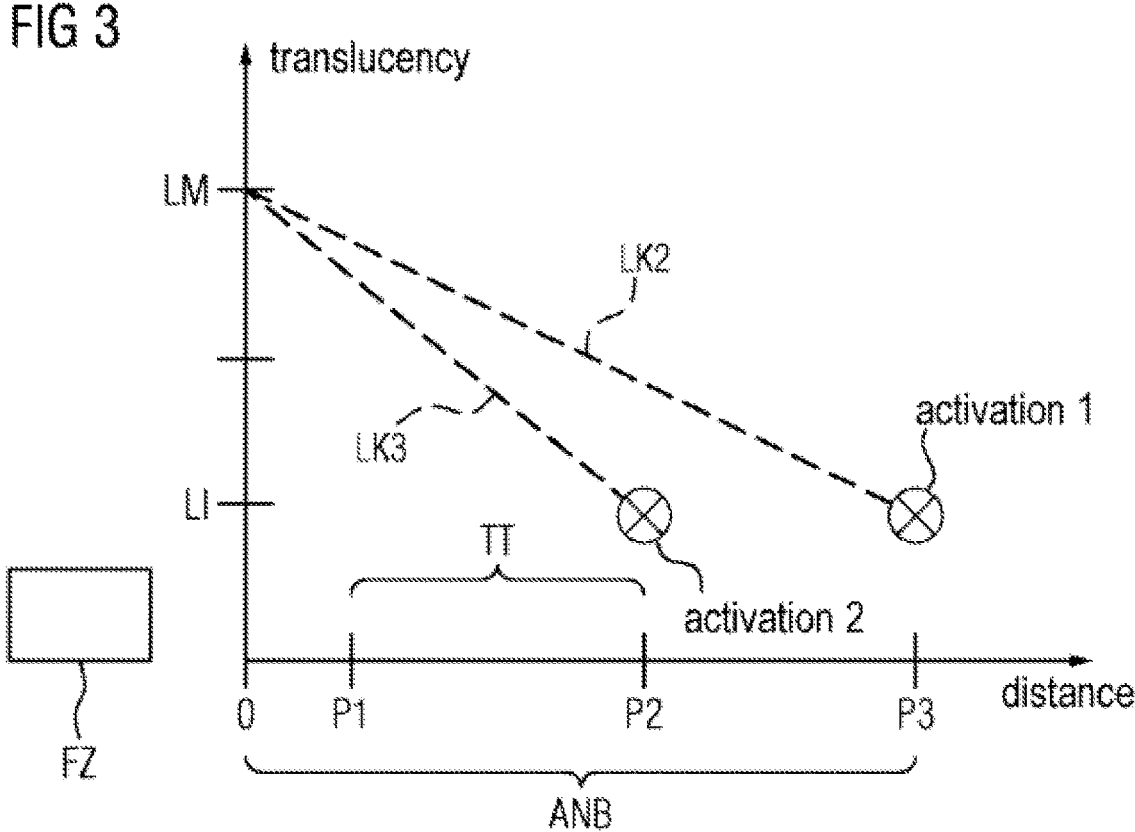
FIG. 3 shows a diagram illustrating the actuation of the one or more windows as a function of the position or the distance between the vehicle and an identification transmitter according to a second and third embodiment of the actuation.

Reference will now be made to FIG. 3, in which a schematic illustration relating to the setting of the translucency as a function of the distance of the identification transmitter IDG1 from the vehicle FZ according to a second and a third embodiment is shown. For a basic explanation of the illustration of the diagram with respect to the X and Y axes, reference is made to FIG. 2.

According to the second embodiment, simple distance-dependent actuation of the windows S1-S4, SF and SH (or of only individual windows thereof) is carried out. Again the situation taken as a starting point is that in which the vehicle FZ has been shut down or parked and the windows S1-S4, SF and SH have been placed by the actuation device AST in a state in which they have low translucency, in particular minimum translucency LI, in order to prevent any view into the passenger compartment FGZ for reasons of protection against theft. In addition to this "parked state" of the windows, in the simplest case there is also to be a "driving mode state" of the windows in which they have higher translucency than in the parked state, in particular maximum translucency LM.

If a user with the identification transmitter IDG1 approaches the vehicle FZ and arrives at the position P3, a first exchange of radio signals between the vehicle FZ and the identification transmitter IDG1 begins, as detailed above, during which exchange an identification code is also transmitted from the identification transmitter IDG1 to the vehicle FZ. If the identification code which confirms the association of the identification transmitter IDG1 with the vehicle is correct, which is checked by the access section ZGA, the actuation device AST will start the actuation of one or more of the windows S1-S4, SF and SH. According to the second embodiment, the actuation is carried out by the actuation device AST in such a way that it outputs an actuation signal to the windows S1-S4, SF and SH so that they assume the "driving mode state" with high translucency (when the approach range or the position P3 is reached). This allows for the case in which individual windows or all the windows do not react directly to the actuation signal but rather have a certain amount of inertia or delay when the translucency is changed. As a result of the early activation (denoted as "activation 1" in the drawing) it can therefore be ensured that the changing of the translucency is already started before the identification transmitter IDG1 arrives at the vehicle FZ, and there is a high probability it will be concluded, or concluded soon, when arrival occurs. The curve LK2 which is now dashed is intended to illustrate only the changing of the translucency in one or more windows, which occurs with a time delay if the identification transmitter has moved from the position P3 to the position P1 (after the "activation 1" has taken place).

FIG. 3 also shows a third embodiment relating to the actuation of the one or more windows S1-S4, SF and SH. Here, the actuation device AST is intended to take into account the time interval TT which a window (with a special optically active material) takes to change from the "parked state" into the "driving mode state". If an identification transmitter IDG1 approaches the vehicle FZ again and enters the approach region ANB, the access section ZGA starts again with the position determination of the identification transmitter. On the basis of a plurality of position measurements, the access section ZGA can not only determine the position of the identification transmitter IDG1, but also the movement speed thereof. Therefore, the access section ZGA can predict the anticipated arrival time of the identification transmitter IDG1 at the vehicle FZ. Given knowledge of the arrival time and of the time interval for the (complete) changing of the translucency state of one or more windows, the actuation device AST can then activate the one or more windows precisely at a specific time before the arrival of the identification transmitter IDG1 at the vehicle FZ, at which time it is still possible to change the translucency state of the one or more windows completely (up to the arrival of the identification transmitter). If, for example in FIG. 3, the identification transmitter IDG1 is at the position P2 and moves with a predicted speed in the direction of the vehicle FZ to the position P1, wherein, in order to travel along the distance between the position P1 and position P2 a time interval TT is predicted, when the identification transmitter IDG1 is detected at the position P2 the actuation device AST will then start to activate the one or more windows ("activation 2") in order to move them into the "driving mode state". In this way, the optimum time for changing the translucency for the windows can be determined by the actuation device AST. The curve LK3 which is now dashed is intended to illustrate only the changing of the translucency in one or more windows, which occurs with a time delay if the identification transmitter has moved from the position P2 to the position P1 (after the "activation 2" has taken place).

The invention claimed is:

1. A method for operating one or more windows, which are installed in a vehicle and delimit a passenger compartment and whose optical properties can be changed by electrical actuation, wherein the method comprises the steps of:
   determining position of an object located outside the vehicle, wherein the determining of the position of the object is performed by at least one of an optical sensor and a radio module, wherein the radio module emits interrogation signals, as low frequency radio signals, for triggering transmission of object-side radio signals and receives the object-side radio signals, as high frequency radio signals, which contain position data of the object outside the vehicle; and
   actuating the one or more windows as a function of distance between the vehicle and the object and time interval of change of window translucency from parked state into driving mode state in reaction to actuation in such a way that translucency of the one or more windows is increased with decreasing distance of the object from the vehicle, the translucency is decreased with increasing distance of the object from the vehicle, and the change from the parked state into the driving mode state is completed with high probability when the object arrives at the vehicle.

2. The method as claimed in claim 1, wherein the electrical actuation of the one or more windows is started when the distance of the object from the vehicle is below a first predetermined distance of the object from the vehicle.

3. The method as claimed in claim 1, wherein the electrical actuation of the one or more windows is performed at a specific distance of the object from the vehicle which is less than a first predetermined distance and greater than a second predetermined distance.

4. The method as claimed in claim 1, wherein the optical sensor is configured to capture the object located outside the vehicle.

5. The method as claimed in claim 1, further comprising the step of image-processing a captured image of the object to identify at least one of the object and a specific property of the object.

6. The method as claimed in claim 5, wherein the electrical actuation of the one or more windows is performed when the image-processing step has detected at least one of a specific object and a specific property of the object.

7. The method as claimed in claim 1, wherein the object-side radio signals comprise an identification code.

8. The method as claimed in claim 7, wherein the electrical actuation of the one or more windows is performed when the identification code received through the object-side radio signals corresponds to a predetermined code.

9. The method as claimed in claim 1, wherein the low frequency signals are of approximately 125 kHz.

10. The method as claimed in claim 9, wherein the high frequency signals are of 433 MHz.

11. The method as claimed in claim 1, wherein the time interval of change of window translucency from parked state into driving mode state in reaction actuation comprises at least one of inertia and delay of change in translucency from actuation.

12. The method as claimed in claim 1, further comprising determining optimum time for changing the windows translucency.

13. The method as claimed in claim 12, wherein the optimum time for changing the windows translucency completes the change from the parked state into the driving mode state before arrival of the object at the vehicle.

14. The method as claimed in claim 12, wherein the optimum time for changing the windows translucency completes the change from the parked state into the driving mode state at arrival of the object at the vehicle.

15. The method as claimed in claim 12, wherein the optimum time for changing the windows translucency completes the change from the parked state into the driving mode state soon after arrival of the object at the vehicle.

16. The method as claimed in claim 12, wherein the determining of the optimum time for changing the window translucency is by the actuation device.

\* \* \* \* \*